A. ABRAMS.
METHOD AND APPARATUS FOR GENERATING SMOKE AND TESTING POROUS MATERIAL THEREBY.
APPLICATION FILED JAN. 14, 1919.
1,395,247.
Patented Nov. 1, 1921
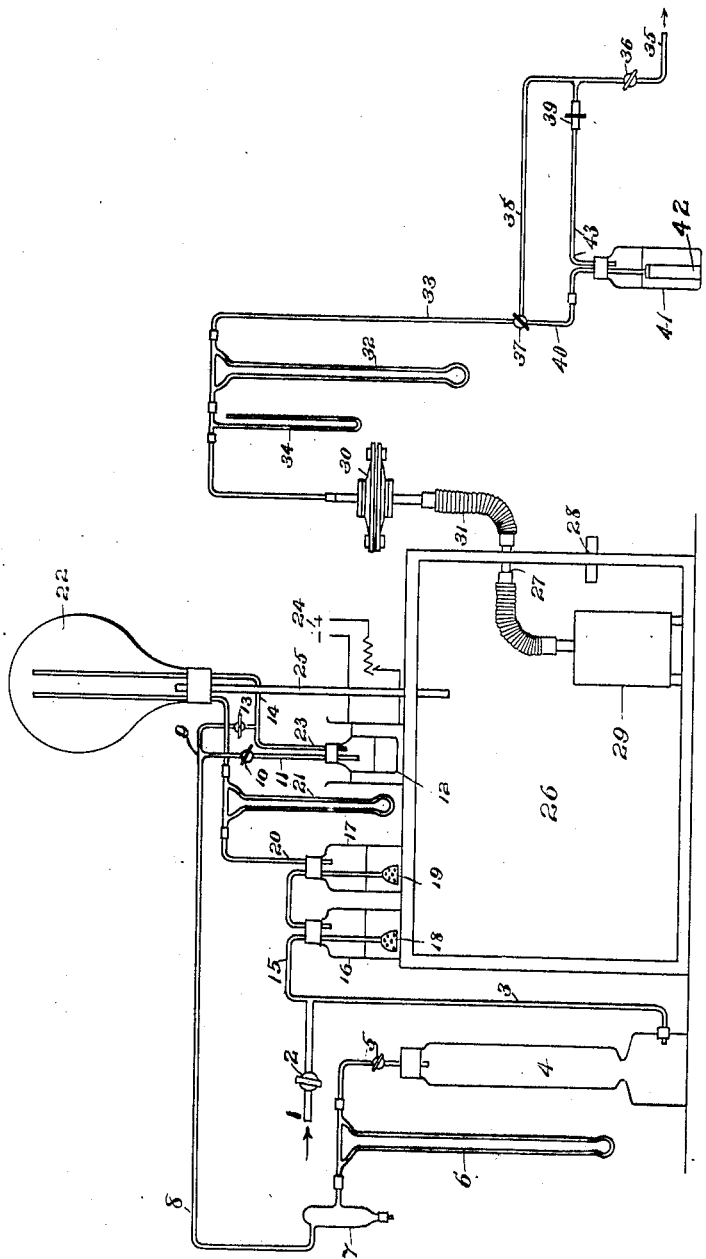
Inventors
Allen Abrams

UNITED STATES PATENT OFFICE.

ALLEN ABRAMS, OF BUTLER, PENNSYLVANIA.

METHOD AND APPARTAUS FOR GENERATING SMOKE AND TESTING POROUS MATERIAL THEREBY.

1,395,247.     Specification of Letters Patent.     Patented Nov. 1, 1921.

Application filed January 14, 1919. Serial No. 271,112.

*To all whom it may concern:*

Be it known that I, ALLEN ABRAMS, a citizen of the United States, residing in Butler, Pennsylvania, have invented certain new and useful Improvements in Methods and Apparatus for Generating Smoke and Testing Porous Material Thereby, of which the following is a specification.

This invention relates to processes and apparatus for generating smoke and for the application of this smoke to testing the porosity of materials, such as paper, ceramic materials, felted materials, and other fabrics.

One object of this invention is to provide a method and means for ascertaining the distribution of pores in the material in order to determine the uniformity in its structure.

Another object of this invention is to provide a method and means for determining how much of a given smoke will pass through certain material during a given period.

Another object of this invention is to provide a novel method and means for accelerating the absorption of gas or smoke by an absorbing solution.

Another object of this invention is to provide a method and means for generating smoke, more specifically $H_2SO_4$ smoke.

Reference is to be had to the accompanying drawing wherein certain parts of the apparatus are shown more or less diagrammatically.

Air is supplied from an inlet pipe (1) and passes through the valve (2) and then branches into two air lines. Part of the air passes through the pipe (3) into the tower (4) containing a hygroscopic substance, such as $CaCl_2$, for the purpose of drying the air, from which it passes through the valve (5) and then through the flow-meter (6) to a trap (7). The function of the trap is to catch any overflow from the flow-meter in case any sudden pressure is put on the line. After leaving the trap (7) the air passes on through the pipe (8) and is again divided at (9) into two streams. One part passes through the valve (10) and pipe (11) into the vessel (12) containing $SO_3$. The other stream passes through the valve (13) and then through the pipe (14) where it joins gas or vapor coming from the vessel (12).

The other air line serves as the main source of air for the apparatus and the air on leaving the valve (2) passes through the pipe (15) through the humidifiers (16) and (17), which are provided with bell-bubblers (18) and (19) and also contain dilute $H_2SO_4$. By proper regulation of the concentration of $H_2SO_4$ the humidity of the air can be controlled. Since the average laboratory temperature for the greater part of the year is in the neighborhood of 20° C., the absolute humidity, corresponding to 100% saturation at 20° C., is selected, and this will provide against condensation of moisture in the apparatus. When working at other temperatures, the humidity should be modified to conform to the different conditions. The air is thus forced to pass through the dilute $H_2SO_4$, because the bubblers reach below the surface of the liquid, and then passes out of the humidifier through the pipe (20) and then through a flow-meter (21) to a mixing chamber (22).

The vessel (12) contains $SO_3$ either in solid or liquid form, and the dried air which comes in through the pipe (11) takes up some of the $SO_3$ and then passes out through the top of the vessel (12), and through the pipe (23) to the pipe (14) and then to the mixer (22). The vessel (12) may be provided with a jacket or a bath of oil or other liquid for the purpose of controlling and regulating the temperature of the $SO_3$ in the vessel. Satisfactory results may be obtained when the temperature of the $SO_3$ is between 15 and 35° C. In this apparatus there is shown a source of electrical energy (24) for the purpose of heating the oil in the bath.

The generation of smoke is accomplished as follows: The air after being dried by the $CaCl_2$ is conducted into the vessel (12) containing the $SO_3$. When liquid $SO_3$ is used, the pipe (11) extends above the surface of the liquid and the air blows over the $SO_3$, but when solid $SO_3$ is used, the pipe (11) extends into the $SO_3$ and almost to the bottom of the vessel (12). The air coming in contact with the $SO_3$ takes up some of this $SO_3$ and passes out through the pipes (23) and (14) into the mixer (22). Air carrying moisture is conducted from the humidifiers to the mixer (22) and in this chamber the humidified air and the air carrying $SO_3$ are mixed, producing a smoke.

The physical characteristics of the smoke particles vary with the manner in which their components are brought together and also with the amount of moisture in the humidified air and the percentage of $SO_3$ in the air entering the mixer (22). Smokes possessing different physical characteristics may be obtained by proper regulation of these conditions.

A further means of modifying the physical characteristics of the smoke particles is by introducing dry air directly into the mixer and this may be accomplished by means of the valve (13), the dry air passing from the air line (8) through the valve (13) into the pipe (14) and then into the mixer.

From the mixer (22) the smoke passes through the pipe (25) into the smoke chamber (26). This smoke chamber is provided with a plurality of exits (27) and (28) which permit of more than one test being made at one time. When the smoke is to be used for testing the porosity of the materials, it is first made to pass through a canister (29) containing an absorbent material, such as charcoal, which absorbs all of the gaseous particles associated with the smoke and permits only the liquid and solid particles to pass through.

The material to be tested is usually supplied in the form of lamina or sheets and is inserted in a clamping device (30). This clamp is so constructed as to expose a definite area of the material, being tested, to the action of smoke which is supplied from the smoke chamber (26) through the canister (29) and pipe (31).

In testing materials with smoke, it is usually important to know the concentration of the smoke with which the material is being tested. To ascertain this concentration the material and clamp are removed and the pipes are joined by a connection or fitting through which the smoke can pass freely. The smoke passes through this fitting or connection, through the flowmeter (32) into the pipe (33), a manometer (34) being inserted in the line between the fitting and flowmeter. Suction is applied at (35), valve (36) being opened, the three-way valve (37) adjusted so that the pipes (33) and (38) are in communication with each other, and the pinch cock (39) closed. Smoke will be sucked through the fitting and out through the pipe (35) and this gives a means of determining whether smoke is being drawn through the apparatus.

At the end of about a minute the three-way valve (37) is operated so that pipe (33) communicates with pipe (40), the pinch cock (39) is opened, and smoke is drawn through the absorption bottle (41). This absorption bottle is provided with a porous thimble (42), preferably of alundum, which is composed almost entirely of aluminum oxid which causes practically all of the smoke entering the absorption bottle to be absorbed by a standard solution placed therein. All of the smoke must pass through the thimble (42) which is submerged in the standard solution. An excess of standard solution is employed, and when $H_2SO_4$ smoke is used, the standard solution may consist of NaOH dissolved in water. By titrating the standard solution the concentration of the smoke may be calculated, the smoke having been passed into the standard solution for a definite period, and the rate of flow being obtained from the flowmeter.

The fitting or connection is then removed and the clamp (30) and test material are placed in position for test. Smoke is then drawn for about one minute through the material under test and out through the pipe (35) by way of pipe (38). The smoke is then by-passed for a definite period through the pipe (40) to the bottle (41) containing a known quantity of standard solution. By titration of the standard solution the amount of smoke passing through the material under test may be determined.

When it is desired to determine the distribution of the pores in the material a piece of paper, saturated with indicator such as Congo-red, phenolphthalein, methyl orange, litmus or tumeric, etc., is placed on the material being tested, and these are then clamped so that the test paper will be on the side away from the smoke coming from the pipe (31).

Wherever the smoke penetrates the material and then touches the paper, an indication will be shown thereon and in this way it will be ascertained how the pores are distributed in the material under test.

In the claims it is to be understood that where "$SO_3$ gas" is named this expression is meant to cover $SO_3$ in the form of gas, vapor, or mixture of gas and vapor.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a method of absorbing smoke, breaking up by means of porous material the gas films surrounding the smoke particles and subjecting the so-treated particles to the action of an absorbent.

2. In a method of absorbing smoke, breaking up by means of porous material submerged in an absorbent the gas films surrounding the smoke particles and subjecting said particles to the action of said absorbent.

3. In a method of absorbing smoke, breaking up by means of porous alundum submerged in an absorbent the gas films surrounding the smoke particles and subjecting the particles to the action of said absorbent.

4. In a method of absorbing smoke, breaking up by means of an alundum thimble submerged in an absorbent the gas films surrounding the smoke particles and subjecting the particles to the action of said absorbent.

5. A method comprising breaking up by means of porous material the gas films surrounding smoke particles and substantially, completely absorbing said particles by an absorbent.

6. A method comprising breaking up by means of porous material submerged in an absorbent the gas films surrounding smoke particles and substantially, completely absorbing the particles by said absorbent.

7. A method comprising breaking up by means of an alundum thimble submerged in an absorbent the gas films surrounding smoke particles and substantially, completely absorbing the particles by said absorbent.

8. A method of testing porosity comprising passage smoke through the material to be tested then into another porous material submerged in an absorbent.

9. A method of testing porosity comprising passing smoke through the material to be tested and then into an alundum thimble submerged in an absorbent.

10. A method of testing porosity comprising passing $H_2SO_4$ smoke through the material to be tested and then into an alundum thimble submerged in an absorbent.

11. A method of testing porosity comprising passing $H_2SO_4$ smoke through the material to be tested and then into an alundum thimble submerged in a standard absorbent solution.

12. In combination means for generating smoke, a clamp for holding a substance whose porosity is being tested, means for bringing smoke to said substance, a porous absorber and means for conducting the components of the smoke passing through said substance to the absorber.

13. In combination means for generating smoke, a clamp for holding a substance whose porosity is being tested, means for bringing smoke to said substance, an absorber comprising a porous thimble and means for conducting the components of smoke passing through said substance to the absorber.

ALLEN ABRAMS.